United States Patent [19]
Mühlfeld et al.

[11] Patent Number: 5,140,089
[45] Date of Patent: Aug. 18, 1992

[54] METHOD FOR PREPARING A LATENTLY REACTIVE, PASTLY MOLDING COMPOUND MADE FROM DIMERIZED TRIMETHYLOL PROPANE, A PREPOLYMER AND AN ISOCYANATE COMPOUND

[75] Inventors: Horst Mühlfeld, Grasellenbach; Günter Schuhmacher, Weinheim; Michael Hiller, Birkenau; Georg Schloer, Abtsteinach, all of Fed. Rep. of Germany

[73] Assignee: Firma Carl Freudenberg, Weinheim/Bergstr., Fed. Rep. of Germany

[21] Appl. No.: 649,415

[22] Filed: Feb. 1, 1991

[30] Foreign Application Priority Data

Feb. 1, 1990 [DE] Fed. Rep. of Germany ....... 4002961

[51] Int. Cl.$^5$ .............................. C08G 18/10
[52] U.S. Cl. ...................... 528/60; 528/67; 524/733; 524/729; 524/839; 428/290; 428/48; 150/157
[58] Field of Search .................. 528/60, 67; 524/733, 524/729, 839; 428/290, 48; 150/157

[56] References Cited

U.S. PATENT DOCUMENTS 4,390,678  6/1983  LaBelle et al. ................ 528/60

Primary Examiner—Maurice J. Welsh
Assistant Examiner—Rachel Johnson
Attorney, Agent, or Firm—Kenyon & Kenyon

[57] ABSTRACT

A pasty molding compound, which is reactive only above room temperature and is intended for manufacturing temperature-resistant, elasticized duromer molded components, consists of a dimerized trimethylol propane (melting point 109° C., molecular weight 250, OH number 900) and of 1 to 625 parts by weight (per 100 parts of methylene diphenyldiisocyanate) of low-molecular weight and an isocyanate-limited polyester-polyol-diisocyanate-prepolymer, prepared from polycaprolactone and an isomeric mixture of the toluenediisocyanate. This masterbatch, which has an NCO excess of up to 15% over the equivalent quantity of the free OH components can be fortified with fillers and is moldable at low pressures. Furthermore, its application as an impregnating agent for glass-fiber mats to be molded is provided.

13 Claims, No Drawings

METHOD FOR PREPARING A LATENTLY REACTIVE, PASTLY MOLDING COMPOUND MADE FROM DIMERIZED TRIMETHYLOL PROPANE, A PREPOLYMER AND AN ISOCYANATE COMPOUND

FIELD OF THE INVENTION

The present invention relates to a method for preparing a latently reactive, pasty molding compound for making elasticized duromer molded components. The pasty molding compound is particularly useful in the production of automotive engine housings, thermal shields and suction pipes; and for production of carrier disks for supporting rollers in textile machines.

BACKGROUND OF THE INVENTION

Although conventional thermosetting plastics, such as phenol, epoxide and unsaturated polyester resins used for making duromer molded components may show substantial stability and long-lasting, high-temperature resistance at temperatures up to more than 200° C., these advantageous properties may be limited due to brittleness, particularly at temperatures below 0° C.

Recently discovered latently reactive pasty polyurea systems, can be processed into molded components that demonstrate excellent durability at high and low temperatures. (unpublished German Patent Application P 39 40 159.6). This pasty polyurea system which becomes reactive above room temperature, comprises a masterbatch that includes a methylene diphenyldiisocyanate, which is liquid at room temperature; an alkali halogen salt complex, which is reactive only above 120° C., and 4,4' diphenyl methanediamine or optionally of hexamethylene-6,6' diaminecarbamate, as well as, about 1 to 625 parts by weight (per 100 parts methylene diphenyldiisocyanate) of low-molecular weight, isocyanate-terminated polyesterpolyoldiisocyanate-prepolymer, prepared from polycaprolactone polyol and an isomeric mixture of toluenediisocyanate. This masterbatch, which may have an NCO- excess of up to 15% over the equivalent number of free OH— and $NH_2$— components, can be strengthened with fillers and is moldable at low pressures. This masterbatch is also useful as an impregnating agent for moldable glass-fiber mats.

Difficulties may arise in the processing the above-described pasty polyurea systems, particularly with molded components having large-surface areas and/or complicated contours, because at processing temperatures more than about 160° C., these highly reactive systems immediately form a polyurea film at points of contact with hot mold cavities which may hinder complete removal of air trapped in the cavity. Another disadvantage of the pasty polyurea systems is that the required diamine complex is commercially available only in combination with a softening agent. The softening agent reduces internal bonding and stability of finished molded components and also reduces the effectiveness of reinforcing additives. Detrimental exudation of the softening agent from such molded components has also been observed.

Although prior art polyurethane duromers comprising highly cross-linked polyurethane aggregates having linear, short chain polyester disocyanate segments could be reacted at higher temperatures than their liquid or liquefied starting components during casting processes; due to the very high reaction rate of such systems, it would be difficult, if not impossible, to control their reaction during actual production.

OBJECTS AND SUMMARY OF THE INVENTION

An object of the present invention is to provide a molding compound useful as a masterbatch for preparing duromer molded components resistant to high and low temperatures.

Another object of the invention is to provide a masterbatch from which elasticized duromer components can be molded which fulfill a variety of requirements and particularly the requirements for automotive applications, specifically: Cold temperature resistance down to about −40° C. with high notch impact resistance; Dimensional stability up to about +250° C. (especially significant when molded components are used in close proximity to a hot engine); Workability at molding pressures, of about 1000 $t/m^2$ or less; Storage stability even during long storage and transport periods (improved availability of larger quantities of ready-to-use molding compounds); Very low viscosity of the masterbatch which allows for addition of substantial quantities of filler (therefore substantial range of variation with respect to the mechanical properties of the molded articles to be manufactured); and ability of the masterbatch to bond permanently with other polyurethane materials, during or after molding processes.

Another object of the invention is to provide a molding compound useful for making molded components having complicated contours and/or large surface areas at temperatures greater than about 160° C., without film forming of the molding compound that interferes with the escape of air from the mold cavity.

Another object of the invention is to provide a molding compound with readily available materials that does not include softening agents.

The present invention provides a molding compound comprising a composition including highly cross-linked polyurethane aggregates with linear, short-chain polyester-diisocyanate prepolymer which may be prepared in accordance with the method described below. More particularly, the invention provides a method for preparing a latently reactive, pasty molding compound for manufacturing elasticized duromer molded components, which are dimensionally stable from about −40° C. to about +250° C., comprising the steps of preparing a viscous masterbatch having an excess of NCO groups of up to 15% greater than equivalent quantity of available free OH groups, including methylene diphenyldiisocyanate, which is liquid at room temperature and has a functionality of 2 to 3; about 1 to 625 parts by weight (per 100 parts of methylene diphenyldiisocyanate) of a polyester polyol-diisocyanate-prepolymer having a molecular weight of about 800 to 1350, prepared from polycaprolactone polyol having a molecular weight of about 500 to 1000 and an 80/20 isomeric mixture of the 2,4-/2,6- toluylenediisocyanate; and dimerized trimethylol propane having a melting point greater than about 100° C., a molecular weight of about 250 and an OH number of about 900.

DETAILED DESCRIPTION OF THE INVENTION

Preferably, the molding compound will include an NCO group excess of up to about 15% above the equivalent quantity of available free OH groups. This excess reduces the effect of the decline in isocyanate groups which may occur spontaneously during storage and transport. Exact stoichiometric ratios have been found to result in an NCO deficiency due to moisture present in the various ingredients; fluctuations in the OH concentration of the polyol; and also due to uncontrollable secondary reactions, for example, allophanate, biuret or isocyanate formation.

The reaction inhibition which occurs in the molding compound at temperatures of up to about 100° C. (in this temperature range, one cannot establish a reaction-dependent change in the viscosity of the compound) is a result of the two-phase system, comprised of small-sized, solid polyol particles dispersed into the relatively low-viscosity liquid phase. Under these conditions only those OH groups found at the particle surfaces are available to react with the NCO groups. Thus polyurethane formation reaction can proceed at a significant rate only after the melting temperature of the polyol particles is reached. For example, at operating temperatures of about 170° C., which are conventional in the industry, 2 mm thick plates may be fully hardened after about 90 seconds.

In contrast to conventional polyurea systems preparation, the polyurethane reaction in the molding compound of this invention proceeds under considerably milder molding conditions, so that adequate production safety may be ensured at the required processing temperatures, usually over about 160° C. For example, after the viscous molding compound has been poured into a mold cavity and the mold has been closed, and even after the molding compound has been distributed throughout the mold cavity, the hardening reaction will not have advanced to the point where the homogeneity of the resultant molded component product would be adversely affected. The cycle times for manufacturing the molded components are not unreasonably prolonged by the delayed hardening reaction, since the thermal conductivity of the duromers is the predominant factor controlling the hardening rate of the molding compound.

Air pockets in the hot mold are also avoided because the molding compound undergoes an initial reduction in viscosity. Moreover, the reaction proceeds at a significant rate and continues until the molded component is completely hardened after air has been expelled from the mold cavity.

In the absence of softening agents exudation out of the finished molded articles is avoided and the resultant molded components have a very high internal strength.

The polymeric, higher functional isocyanates which are liquid at room temperature and have a functionality of 2 to 3 include, for example, (untreated) 4,4'-methylene diphenyldiisocyanate (MDI) or a carbodiimide-modified MDI. Both are commercially available..

The isocyanate-terminated polyester polyoldiisocyanate-prepolymer having a molecular weight of about 800 to 1350 may be prepared from polycaprolactone polyol having a molecular weight of about 500 to 1000 and isomeric (2,4-/2,6-) mixtures of toluenediisocyanate, having an isomer ratio of about 80:20. About 1 to 625 parts by weight of this prepolymer may be added to the molding compound per 100 parts of the polymeric, higher functional isocyanate.

The dimerized trimethylol propane is a fine powder at room temperature, which may be dispersed homogeneously into the liquid prepolymer-/diisocyanate mixture and has a molecular weight of about 250, an OH-number [hydroxyl value] of about 900, and is reactive above about 100° C. The dimerized trimethylol propane particles preferably have a melting point of about 109° C.

The dimerized trimethylol propane provides a tetrol which is a four-functional OH active compound that enables a very high degree of cross-linking. Above 100° C., the dimerized trimethylol propane reacts with the polyfunctional polyisocyanate and the terminal isocyanate groups of the polyester-polyurethane prepolymers to form highly cross-linked polyurethane. Below this temperature, no significant reaction takes place. The cross-linking is evident from the high-temperature stability (above 200° C.) of the final molded components. Such high temperature stability is unusual for polyurethane molded components.

The molding compound, which is substantially non-reactive at room temperature, may have a viscosity as low as about 1000 to 5000 cP. This viscosity range is low enough to enable preparation of highly loaded and nevertheless fluid pasty masterbatch from the liquid molding compound. It may be useful to add large amounts of filler to vary the mechanical properties of molded components to be manufactured with this invention. The filled molding compound (masterbatch) is not so compacted that molding pressures of up to 1000 t/m$_2$ are required to effect molding operations. Even when 150% by weight of filler is added to the masterbatch molding pressures in the range of about 10 t/m$_2$ are effective.

Preferred fillers include, for example, textile fibers, glass fibers, chalk powder, fly ash, hollow-glass spheres (microspheres), or mixtures thereof.

In a further refinement of the invention, it is possible to impregnate a glass-fiber mat with the molding compound, which can also include other fillers. In this manner, after the molding operation, one obtains particularly strong molded components. Due to its low viscosity, the molding compound penetrates completely into the pores of the glass-fiber mats, thus increasing the mechanical stability of the resulting molded component.

Thus the method according to the invention makes it possible to prepare a molding compound which is capable of incorporating a large quantity of added filler due to its low viscosity. As a result the mechanical properties of elasticized molded components produced with the molding compound may be varied within a wide range depending on the type and quantity of the filler materials incorporated. Thus hardness, strength, rigidity, flexural strength, dimensional stability and specific gravity of the finished molded component are easily modified.

Admixture of separate glass fibers increases the strength and elastic modulus of a molded component. Fine-grained fillers, for example chalk, increase rigidity. The specific gravity of the molded component can be lowered by adding fly ash to the low-viscosity molding compound. When glass-fiber mats are impregnated with the viscous, molding compound (which can contain additional fillers) it is possible to manufacture molded components, which show considerable tensile strength [tear resistance] and good dimensional stability, using hot-pressing [hot-molding]methods. In any case, the molding conditions are mild due to the low viscosity of the molding compound prepared in accordance with the invention. The low tenacity is the result of the low mechanical resistance to molding pressure, which may be substantially lower than pressures encountered in molding conventional thermoplastics.

A temperature range of about 150° C. to 180° C. for the pressing operation has proven to be particularly favorable in view of a short cure time and thus short cycle times at the molding press.

The masterbatch may be bonded to other polyurethane materials in the molding press by pressing a composite of the two materials at about 160° C. to 180° C. Such composites can also be made with foamed polyurethanes. The molding operation may be simultaneous with the pressing operation. An adhesive agent is not required to adhere the composites because the molding compound is latently reactive.

In an alternative embodiment a molded duromer composite component can be prepared by coating a first component with a liquid polyurethane molding compound prepared according to the invention. After hardening, the coating and coated component are bonded securely together. It is usually not necessary to apply an adhesive agent because the bond is so strong that the coating and coated component cannot be separated from each other without damage.

The uses and advantages of the molding compound of the invention, as well as its behavior in a mold, will be further clarified by the following illustrative Examples.

EXAMPLE 1

Prepolymer Formulation 100.0 parts by weight of polycaprolactone polyol with a (molecular weight of 540)

59.2 parts by weight of toluylene diisocyanate; 80/20-isomeric mixture 2,4-/2,6-

Preparing the Prepolymer

The polycaprolactone polyol is reacted with the toluylene diisocyanate by stirring them together for 30 minutes at a temperature of 100° C. to produce a prepolymer having an isocyanate concentration (NCO excess) of 8.18% and a viscosity of 54000 cP.

Latently Reactive Mixture Formulation 86.0 parts by weight of prepolymer with an NCO value of 8.18%;

50.4 parts by weight of untreated MDI (untreated 4,4'-methylene diphenyldiisocyanate with an NCO value of 30.0% (determined in advance through analysis);

31.2 parts by weight of dimerized trimethylol propane having a molecular weight of 250 and an OH number [hydroxyl value] of 900;

111.0 parts by weight of chalk with an average particle diameter of 3 micrometers.

Preparing the Latently Reactive Mixture

The three main constituents: prepolymer, untreated MDI and dimerized trimethylol propane are premixed in a mixing vessel at room temperature. The chalk is added subsequently while the masterbatch is being stirred. A paste is formed which has good casting capability and a viscosity of 72000 cP.

This paste can be stored for at least four weeks with the exclusion of moisture in a tightly sealed vessel without experiencing any loss in its good workability or any substantial change in its properties.

To establish the physical properties of components made with the paste, testing blanks are cut from endless glass-fiber met. These blanks are then soaked with the paste. After 90 seconds at 170° C. and at a molding pressure of 1 kg/cm$^2$, hardening is completed. A secondary treatment is not needed. The glass-fiber content in the final product amounts to about 25% by weight.

| Physical Properties | |
|---|---|
| Tensile strength: | 88 N/mm$^2$ |
| Breaking elongation: | 1.5% |
| Modulus of elasticity: | 8400 N/mm$^2$ |
| Flexural strength: | 213 N/mm$^2$ |
| Flexural modulus: | 8700 N/mm$^2$ |
| Edge-fiber elongation: | 3.5% |
| Impact resistance at room temperature: | 42 mJ/mm$^2$ |
| Impact resistance at -40° C.: | 51 mJ/mm$^2$ |

Testing Temperature Resistance

To test the temperature resistance of the duromer material, a creep test is carried out by measuring bending of test rods fabricated with the paste under load at various temperatures. After 24 hours at 180° C., the test rods manufactured according to this example do not show any deformation.

From the above physical property values, it is apparent that the duromer material has a high load-bearing capacity particularly over a temperature range extending from far below the freezing point up to very high temperatures.

Molds for an Engine Housing

A glass-fiber blank cut from an endless glass-fiber mat having a weight of 459 g, is inserted into a mold heated to 170° C. The above-described reactive paste is poured over the glass-fiber blank; a second glass-fiber blank is inserted, and the mold is closed. At a molding pressure of 1 kg/cm$^2$, the glass-fiber mats are completely impregnated with the paste, and the mold is filled in uniformly. After 90 seconds, the molding operation is complete. The resulting 2 mm thick molded component is completely hardened. A secondary treatment is not required.

After the mold is closed, a uniform flow and a completely homogeneous distribution of the liquid paste is established throughout the mold cavity. The reaction rate, as well as the heating of the paste are delayed in a way that prevents the reaction from starting too soon on the surface of the mold. Peeling off of film, trapped air (casting bubbles) and unfilled undercuts are not observed.

EXAMPLE 2

This example demonstrates that, as an alternative to untreated MDI, other liquid methylene diphenyldiisocyanates having a functionality of 2 to 3 can be used.

The modified MDI applied in this Example is preferred when increased demands are placed on the hydrolytic stability of the component because carbodiimide segments integrated in the molecular structure of the diisocyanate are known to improve this property.

Formulation for the Latently Reactive Mixture 120.0 parts by weight of prepolymer, as in Example 1
95.0 parts by weight of carbodiimide-modified MDI with an analytical NCO value of 29.6%;
53.6 parts by weight of dimerized trimethylol propane according to Example 1;

179.0 parts by weight of chalk with an average particle diameter of 3 micrometer.

Preparing the Latently Reactive Mixture

The three main constituents prepolymer, carbodiimide-modified MDI and dimerized trimethylol propane are premixed in a mixing vessel. The chalk is added subsequently while the masterbatch is being stirred. The viscosity of the masterbatch, which is a castable paste, is about 69000 cP.

| Physical Properties | |
|---|---|
| Tensile strength: | 94 N/mm$^2$ |
| Breaking elongation: | 1.5% |
| Modulus of elasticity: | 8600 N/mm$^2$ |
| Flexural strength: | 190 N/mm$^2$ |
| Flexural modulus: | 8550 N/mm$^2$ |
| Edge-fiber elongation: | 3.2% |
| Impact resistance at room temperature: | 40 mJ/mm$^2$ |
| Impact resistance at -40° C.: | 47 mJ/mm$^2$ |

These values demonstrate the high load-bearing capacity of the fully hardened product over a broad temperature range.

An engine housing having numerous undercuts can be molded with the above-described masterbatch, as described in Example 1 without trapped air bubbles and the prefabricated part is hardened through in a completely homogeneous fashion.

What is claimed is:

1. A method for making a latently reactive, pasty molding material for producing elasticized, molded, duromer components, which are dimensionally stable from about −40° C. to +250° C., comprising the steps of preparing a viscous materbatch having an excess of NCO groups of up to 15% greater than available free OH groups, including
    a) a higher functional isocyanate, which is liquid at room temperature and has a functionality of about 2 to 3;
    b) about 1 to 625 parts by weight (per 100 parts of (a)) of a polyester polyoldiisocyanate-prepolymer having a molecular weight of about 800 to about 1350, prepared from a polycaprolactone polyol having a molecular weight of about 500 to about 1000 and an 80/20 isomeric mixture of the 2,4-/2,6- toluenediisocyanate; and
    c) dimerized trimethylol propane having a melting point greater than about 100° C., a molecular weight of about 250 and an OH number of about 900.

2. The method according to claim 1, wherein the dimerized trimethylol propane has a melting point of about 109° C.

3. The method according to claim 2, further including the step of adding up to about 150% by weight of filler.

4. The method according to claim 3 wherein the filler is selected from the group consisting of textile fibers, glass fibers, chalk powder, fly ash, microspheres and mixtures thereof.

5. The method according to claim 3 wherein the masterbatch has a viscosity of about 1000 to about 5000 cP.

6. The method according to claim 5 wherein the higher functional isocyanate is selected from the group consisting of methylene diphenyldiisocyanate and carbodiimide modified diphenyldiisocyanate.

7. The method according to claim 1 further comprising the step of forming a composite by bonding the masterbatch to a polyurethane.

8. The method of claim 1, further comprising the step of impregnating a glass fiber mat with the masterbatch.

9. A molded engine housing comprising a glass fiber mat impregnated with the masterbatch of claim 1.

10. A latently reactive, pasty molding material for manufacturing elasticized duromer molded components, which are dimensionally stable from about −40° C. to +250° C., comprising a viscous materbatch having an excess of NCO groups of up to 15% greater than available free OH groups, including
    a) a higher functional diisocyanate, which is liquid at room temperature and has a functionality of about 2 to 3;
    b) about 1 to 625 parts by weight (per 100 parts of (a)) of a polyester polyoldiisocyanate-prepolymer having a molecular weight of bout 800 to about 1350, prepared from a polycaprolactone polyol having a molecular weight of about 500 to about 1000 and an 80/20 isomeric mixture of the 2,4/2,6- toluenediisocyanate; and
    c) dimerized trimethylol propane having a melting point greater than about 100° C., a molecular weight of about 250 and an OH number of about 900.

11. The compound according to claim 10, wherein the dimerized trimethylol propane has a melting point of about 109° C.

12. The molding compound according to claim 10 further including adding up to about 150% by weight of fillers.

13. The molding compound according to claim 12 wherein the filler is selected from the group consisting of textile fibers, glass fibers, chalk powder, fly ash, microspheres and mixtures thereof.

* * * * *

UNITED STATES PATENT AND TRADEMARK OFFICE
CERTIFICATE OF CORRECTION

PATENT NO. : 5,140,089

DATED : August 18, 1992

INVENTOR(S) : Muhlfeld, et al.

It is certified that error appears in the above-identified patent and that said Letters Patent is hereby corrected as shown below:

Title page, item [54], change "PASTLY" to --PASTY--.

ABSTRACT, lines 10 and 11, change "toluenediisocyanate" to --toluylene diisocyanate--.

Column 1, line 3, change "PASTLY" to --PASTY--.

Column 1, line 34, change "4,4' diphenyl" to --4,4'-diphenyl--.

Column 1, line 40, change "toluenediisocyanate" to --toluylene diisocyanate--.

Column 3, line 60, change "toluenediisocyanate" to --toluylene diisocyanate--.

Column 5, line 67, change "met" to --mat--.

Column 7, line 49, change "toluenediisocyanate" to --toluylene diisocyanate--.

UNITED STATES PATENT AND TRADEMARK OFFICE
CERTIFICATE OF CORRECTION

PATENT NO. : 5,140,089
DATED : August 18, 1992
INVENTOR(S) : Muhlfeld, et al.

It is certified that error appears in the above-identified patent and that said Letters Patent is hereby corrected as shown below:

Column 8, line 35, change "bout" to --about--.

Column 8, line 39, change "toluenediisocyanate" to --toluylene diisocyanate--.

Signed and Sealed this

Ninth Day of November, 1993

BRUCE LEHMAN

Attest:

Attesting Officer

Commissioner of Patents and Trademarks